(12) United States Patent
Angell et al.

(10) Patent No.: US 6,827,805 B2
(45) Date of Patent: Dec. 7, 2004

(54) METHOD OF MAKING A CONDUCTIVE FILLER

(75) Inventors: Rick L. Angell, Greenville, SC (US); Franklin T. Emery, Ft. Payne, AL (US); Mike E. Lester, Burton, OH (US); Mark A. Williams, Greer, SC (US)

(73) Assignees: Electrolock, Inc., Hiram, OH (US); Siemens Westinghouse Power Corporation, Orlando, FL (US)

( * ) Notice: Subject to any disclaimer, the term of this patent is extended or adjusted under 35 U.S.C. 154(b) by 197 days.

(21) Appl. No.: 10/035,932

(22) Filed: Dec. 26, 2001

(65) Prior Publication Data

US 2002/0084100 A1 Jul. 4, 2002

Related U.S. Application Data

(62) Division of application No. 09/458,489, filed on Dec. 9, 1999.
(60) Provisional application No. 60/112,957, filed on Dec. 18, 1998.

(51) Int. Cl.[7] .................................................. H01B 7/02
(52) U.S. Cl. ...................... 156/201; 156/203; 156/213; 156/217; 174/116; 174/117 FF
(58) Field of Search .............................. 174/116, 125.1, 174/117 FF; 156/200, 203, 47, 50, 201, 217, 213

(56) References Cited

U.S. PATENT DOCUMENTS

| | | |
|---|---|---|
| 1,650,049 A * | 11/1927 | Smith .......................... 493/340 |
| 1,740,076 A | 12/1929 | Delon |
| 1,921,606 A | 8/1933 | Cremer |
| 2,705,292 A | 3/1955 | Wagenseil |
| 2,962,613 A | 11/1960 | Maher et al. |
| 3,654,027 A * | 4/1972 | Middleton ................... 156/438 |
| 3,668,045 A * | 6/1972 | Molins ........................ 156/441 |
| 4,200,818 A | 4/1980 | Ruffing et al. |
| 4,308,476 A | 12/1981 | Schuler |
| 4,318,020 A | 3/1982 | Meyer |
| 4,385,252 A | 5/1983 | Butman, Jr. et al. |
| 4,403,163 A | 9/1983 | Armerding et al. |
| 4,473,765 A | 9/1984 | Butman, Jr. et al. |
| 4,540,967 A | 9/1985 | Chitose |
| 4,853,565 A | 8/1989 | Elton et al. |
| 4,912,283 A | 3/1990 | O'Connor |
| 5,036,165 A | 7/1991 | Elton et al. |
| 5,037,999 A | 8/1991 | Van Deusen |
| 5,066,881 A | 11/1991 | Elton et al. |
| 5,175,396 A | 12/1992 | Emery et al. |
| 5,300,844 A | 4/1994 | Schuler |
| 5,633,477 A | 5/1997 | Smith et al. |
| 5,760,516 A | 6/1998 | Baumann et al. |
| 6,228,494 B1 | 5/2001 | Emery |

* cited by examiner

*Primary Examiner*—Blaine Copenheaver
*Assistant Examiner*—Barbara J. Musser
(74) *Attorney, Agent, or Firm*—Pearne & Gordon LLP

(57) ABSTRACT

A method for producing an electrically conductive filler by placing a web of core material onto an interior surface of a web of conductive layer material. The webs of core material and conductive layer material are directed through a forming station for folding the conductive layer around the core. The filler having a substantially non-conductive core and a conductive layer. The conductive layer is wrapped around the core to form a closed loop thereby establishing conductivity from a bottom of the filler to a top of the filler by paths on each of two sides of the filler.

22 Claims, 5 Drawing Sheets

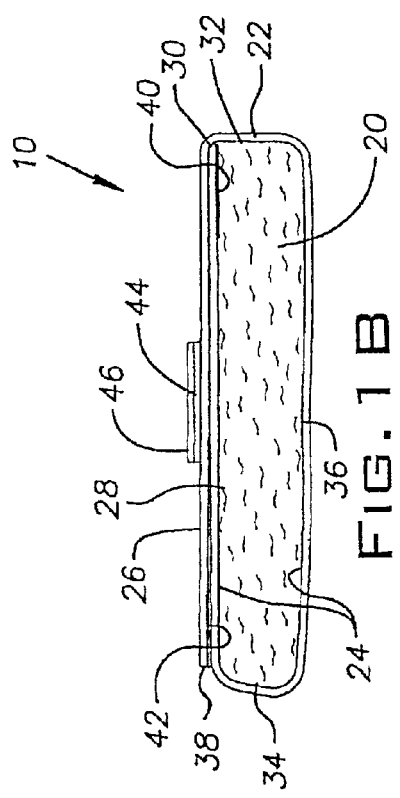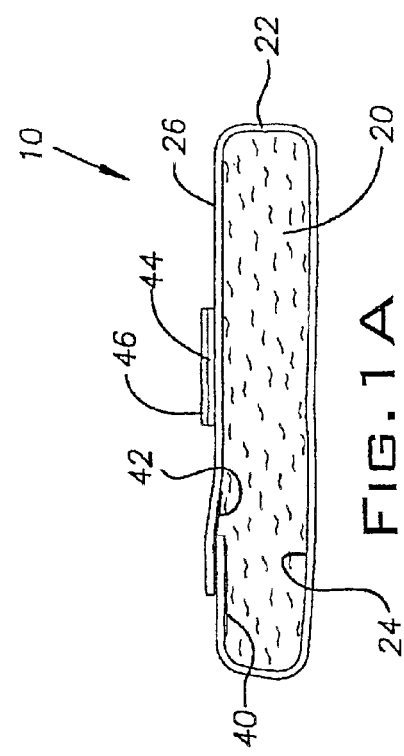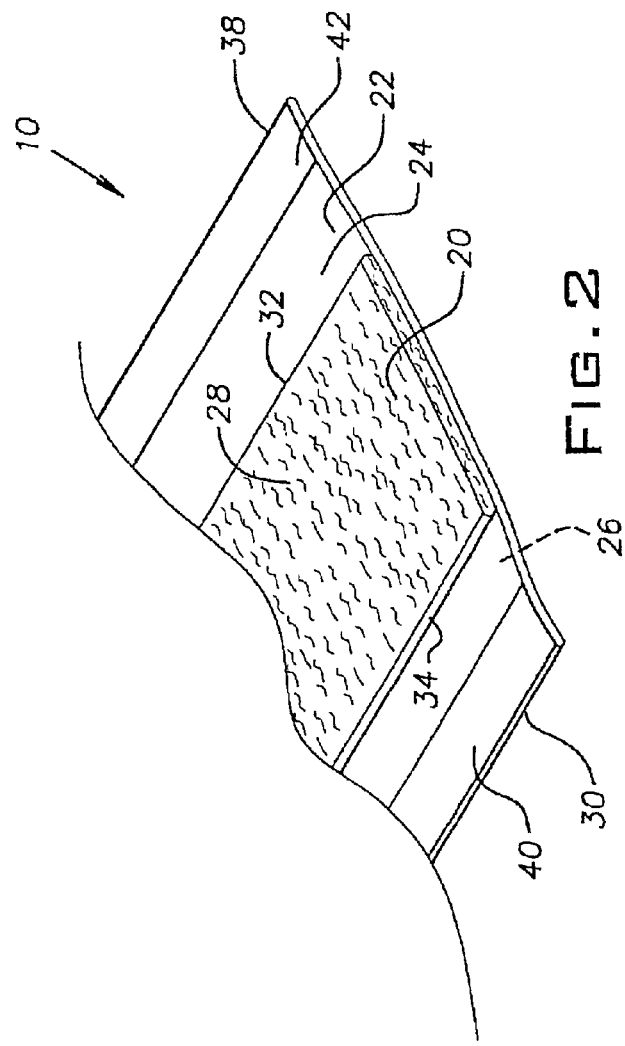

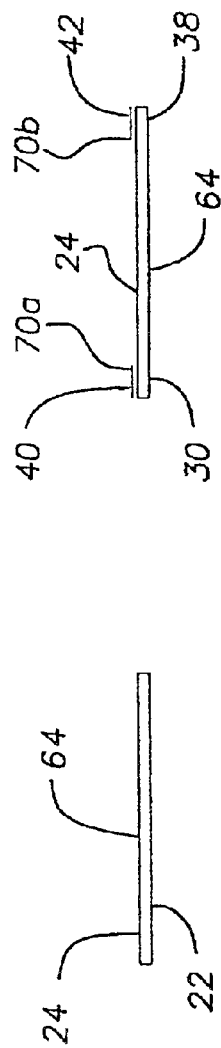
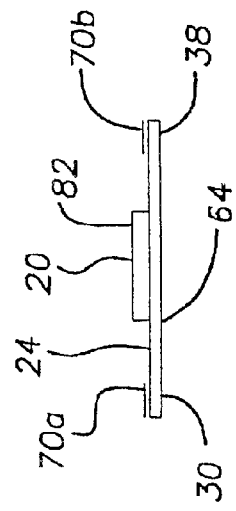
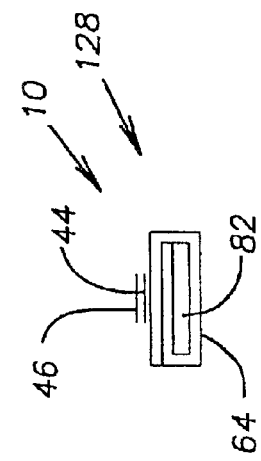
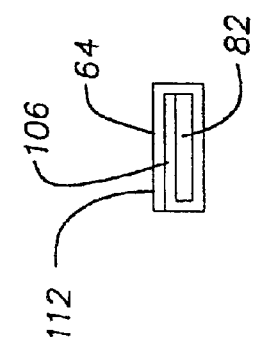

METHOD OF MAKING A CONDUCTIVE FILLER

This application claims the benefit of U.S. Provisional Application No. 60/112,957, filed Dec. 18, 1998 and non-provisional application Ser. No. 09/458,489 filed Dec. 9, 1999.

BACKGROUND OF THE INVENTION

The present invention generally relates to a conductive filler and a method of making the filler. The filler is adapted for use in electrical coils, such as Roebel windings as a Roebel filler to fill interstices between the windings and a casing wall. The filler of the present invention is also useful in other applications where a flexible and/or compressible conductive material is needed. For example, the present filler can be used in the construction of an electrically shielded cabinet.

Various techniques for filling voids between parts in electrically conductive devices are known. Unfortunately, many prior art techniques do not succeed in completely filling the voids and/or suppressing electrical discharge across the voids. Many void fillers act as a dielectric and allow a voltage to be impressed across the filler. Failure to fill the voids or at least suppress discharge will result in undesirable arcing between the components. Arcing leads to diminished efficiency and diminished life expectancy of the device.

An example of a conductive device where voids are present is a high voltage coil havipg windings that are intertwined in a braid-like fashion to form a Roebel bar. Roebel bars, or Roebelled windings, have a highly discontinuous surface. This surface has a great number of voids, or interstices, which must be properly filled in order to reduce mechanical and electrical stresses. U.S. Pat. No. 5,175,396 dated Dec. 29, 1992 to Emery, incorporated herein by reference, discloses such a Roebel bar. The U.S. Pat. No. 5,175,396 discloses a prior art void filler made from Dacron felt impregnated with epoxy. The U.S. Pat. No. 5,175,396 is directed to providing a void filler made from an insulating layer of mica paper and B stage epoxy. A semiconductive layer, preferably a paste of carbon filled epoxy, is placed between the inner insulating layer and a groundwall.

Other filler materials have been used to fill voids in electrical coils. Discussion of a resin rich felt material may be found in U.S. Pat. No. 5,633,477 dated May 27, 1997 to Smith. Discussion of an inert filler material and a pyrolyzed glass fiber layer electrically coupled to the strands of a coil may be found in U.S. Pat. No. 5,066,881 to Elton. These fillers, and other prior art fillers and pre-pegs, are often difficult to install in high voltage coils and/or are not suitable foruse in other applications, such as in the construction of an electrically shielded cabinet.

SUMMARY OF THE INVENTION

The present invention overcomes these disadvantages by providing an electrically conductive filler, the filler having a substantially non-conductive core and a conductive layer. The conductive layer is wrapped around the core to form a closed loop thereby establishing conductivity from a bottom of the filler to a top of the filler by paths on each of two sides of the filler.

According to another aspect of the invention, the conductive layer is wrapped around the core such that the top of the filler is provided with two laminations of the conductive layer.

The present invention provides a method of making a web of conductive filler by placing a web of core material onto an interior surface of a web of conductive layer material. The webs of core material and conductive layer material are directed through a forming station. The forming station turns first and second edges of the conductive layer material upward, folds the first edge of the conductive layer material over the core material, and folds the second edge of the conductive layer material over the first edge of conductive layer material.

BRIEF DESCRIPTION OF THE DRAWING

These and further features of the present invention will be apparent with reference to the following description and drawings, wherein:

FIG. 1A is an end view of a conductive filler according to a first embodiment of the present invention.

FIG. 1B is an end view of a conductive filler according to a second embodiment of the present 5 invention.

FIG. 2 is a perspective view of the conductive filler, according to either embodiment, shown in an intermediate stage of assembly.

FIGS. 5A to 5F are schematic views showing various stages of production for the conductive filler according to the present invention.

DESCRIPTION OF THE INVENTION

Figure 3:
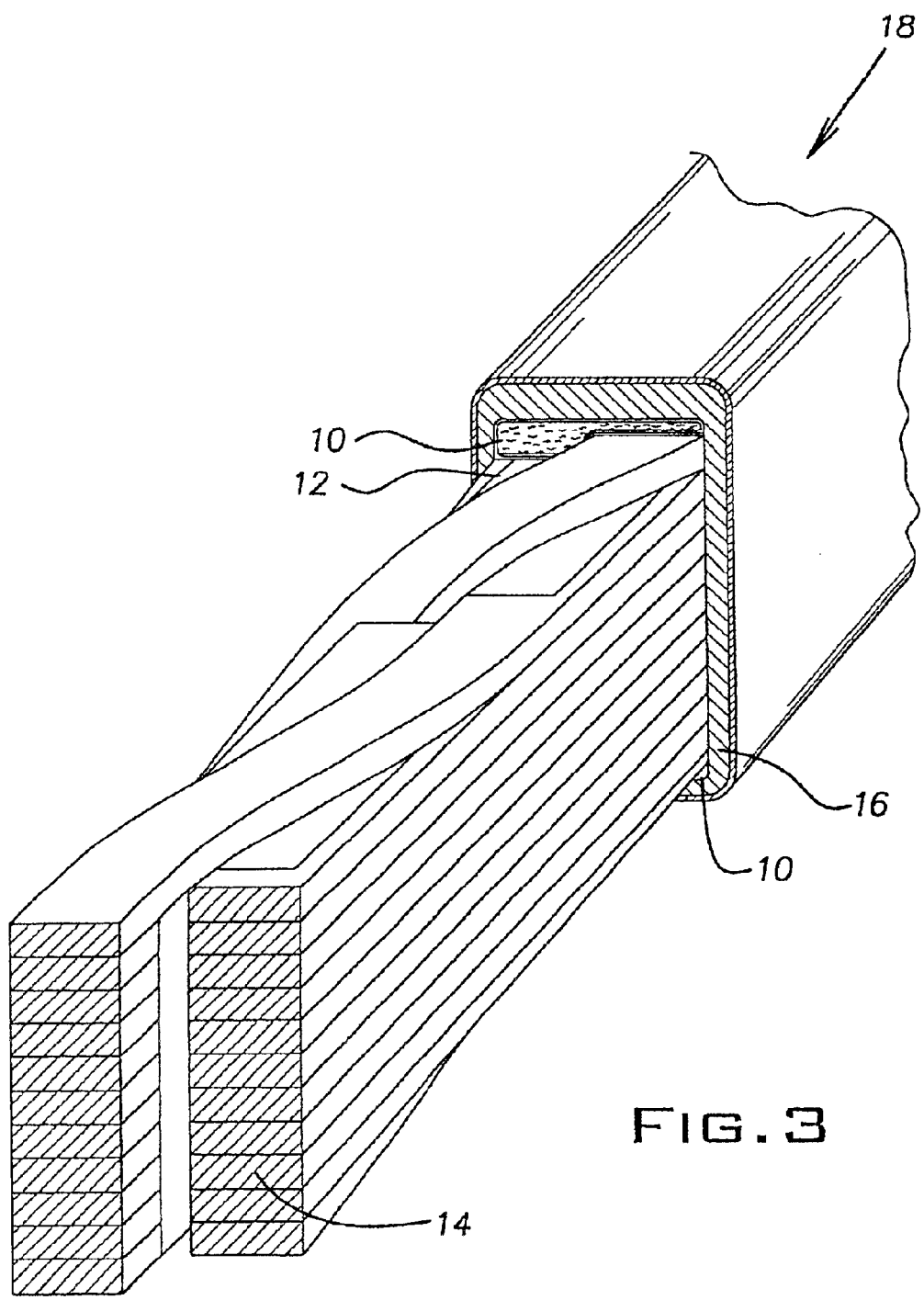
FIG. 3 is a perspective view of a Roebel winding having the conductive filler of the second embodiment.

In the detailed description which follows, identical components have been given the same reference numerals, regardless of whether they are shown in different embodiments of the present invention. In order to clearly and concisely illustrate the present invention, the drawings may not necessarily be to scale and certain features may be shown in somewhat schematic form.

Referring to FIGS. 1A, 1B, 2 and 3, the present invention provides a conductive filler 10. The conductive filler 10 is adapted to fill voids in electrical devices. For example, the filler 10 can be used to fill voids, or interstices 12, created between transposed conductor windings 14 and a groundwall, or casing wall 16, of an electric coil 18 (FIG. 3). A coil 16 of this nature is commonly referred to as a Roebel bar. Additional discussion of Roebel bars is contained in U.S. Pat. No. 5,175,396 dated Dec. 29, 1992 to Emery, incorporated herein by reference. The filler 10 is preferably conductive to suppress electrical discharges. To fill as much of the voids as possible, the filler 10 is preferably compressible. Two lengths of filler 10 are preferably used in each bar, one length being disposed on top of the conductor windings 14 and the other disposed below. Alternatively, additional lengths can be provided along the sides of the winding stacks. In another alternative, lengths of filler 10 can be wrapped around the windings 14.

The filler 10 is preferably conductive, flexible and compressible. These qualities make the filler 10 effective to fill interstices 12 of different shapes and sizes. The conductive properties of the filler 10 prevents voltage from being impressed across an otherwise dielectric filler. If the filler 10 were not conductive, voltage would appear across the filler 10 and undesirable electrical discharges would occur. Accordingly, the filler 10 is well suited for use in Roebel bars and inapplications other than electric coils. For example, the filler can be placed between the panels of an electrically shielded cabinet.

The filler 10 provides a core 20. The core 20 is preferably non-conductive. The core 20 is preferably a felt-like, non-woven material, such as a polyester felt or aramid fiber batts, such as NOMEX. Preferably, the core 20 weighs about 9 ounces per square yard. Preferably, the core 20 is resin rich. More specifically, the core 20 is preferably impregnated with an epoxy, such as bis-a. The epoxy assists the filler 10 in conforming to and staying in the interstices 12 found in a Roebel bar. The core 20 is preferably 50% to 90% loaded with epoxy, more preferably 65% to 85% loaded and most preferably about 80% loaded. A suitable core 20 material is available from Lectromat, Inc., P.O. Box 608, 18 Mars, Pa., 16046.

The filler 10 also provides a conductive fleece, or conductive layer 22, which is wrapped completely around the core 20 to form a closed loop around the core 20. The conductive layer 22 has an interior side 24 disposed towards the core 20 and an exterior side 26 disposed away from the core 20. The conductive layer 22 is preferably made from polyester fibers which are themselves not conductive. The fibers are preferably impregnated with a resin containing a conductive substance, such as carbon. The fibers of the conductive layer 22 are loaded with resin so that the conductive layer 22 has a resistance of about 200 f2 per square. Depending on the application for the filler 10, the resistance per square can be widely varied such as 10 to 1,000,000 0 per square. However, for use in an electric coil 18, a resistance of 200 i2 per square will provide sufficient conduction between the casing 16 and the windings 14 to suppress corona discharge. Suitable material for the conductive layer 22 is available from Isovolta in Vienna, Austria under the name CONTAFEL-H 0865.

The conductive layer 22 is preferably wrapped completely around the core 20 as best illustrated in FIGS. 1A and 1B. Since the conductive layer 22 is wrapped completely around the core 20 to form a closed loop, conductivity is established from a bottom of the filler 10 to a top of the filler 10 by paths on both sides of the filler 10. A first embodiment of the filler 10 is illustrated in FIG. 1A. In the first embodiment, the conductive layer 22 is wrapped completely around the core 20 with a small portion of the conductive layer 22 overlapping itself.

A second embodiment of the filler 10 is illustrated in FIG. 2A. In the second embodiment, the conductive layer 22 is wrapped completely around the core 20 with a large portion of the conductive layer 22 overlapping itself. More specifically, the conductive layer 22 is layered on a top 28 of the core 20 such that a first edge 30 of the conductive layer 22 is generally aligned with a first edge 32 of the core 20. The conductive layer 22 wraps around a second edge 34 of the core 20, a bottom 36 of the core 20 and the first edge 32 of the core 20. The conductive layer 22 continues to wrap around the core 20 such that the conductive layer 22 is layered on top of itself. A second edge 38 of the conductive layer 22 is generally aligned with the second edge 34 of the core 20. As one skilled in the art will appreciate, the fillers 10 of the first and second embodiment are essentially the same, but the conductive layer 22 of the second embodiment is wider than the conductive layer 22 of the first embodiment such that the conductive layer 22 of the second embodiment overlaps itself more than that of the first embodiment.

To show additional features of both embodiments of the filler 10, FIG. 2 shows the core 20 placed on the interior side 24 of the conductive filler 22 in-an intermediate stage of assembly. The assembly process will be described in more detail below. To establish adhesion of the conductive layer 22 to the core 20, the filler 10 is preferably provided with a first layer of pressure sensitive adhesive 40 and a second layer of pressure sensitive adhesive 42. The first and second layers of adhesive 40, 42 are preferably strips of transfer adhesive made from an acrylic with a polyester carrier. The first and second adhesive layers 40, 42 are preferably about 0.25 millimeters thick.

As best illustrated in FIG. 2, the first strip of adhesive 40 is disposed on the interior side 24 of the conductive layer 22 adjacent a first edge 30 of the conductive layer 22. The second strip of adhesive 22 is disposed on the interior side 24 of the conductive layer 22 adjacent a second edge 38 of the conductive layer 22.

As illustrated in FIG. 1A for the first embodiment of the filler 10, when the conductive layer 22 is wrapped around the core 20, the first adhesive layer 40 preferably secures the area adjacent the first edge 30 of the interior surface 24 of the conductive layer 22 to the top 28 of the core 20. The second adhesive layer 42 preferably secures the area adjacent the second edge 38 of the interior surface 24 of the conductive layer 22 to the exterior surface 26 of conductive layer 22 adjacent the first edge 30, or to both the exterior surface 26 of the conductive layer 22 adjacent the first edge 30 and the top 28 of the core 20 as illustrated. In this way, the conductive layer 22 slightly overlaps itself and is, at a minimum, wrapped completely around the core 20. As one skilled in the art will appreciate, the conductive layer 22 may be secured to and wrapped around the core 20 in other ways. For instance, the conductive layer 22 may be wrapped only partially around the core 20.

It is advantageous to wrap the conductive layer 22 completely around the core 20 so that there is electrical conductivity between the top and the bottom of the filler 10. It is desirable to provide this electrical conductivity along both sides of the filler 10 because, in some situations, a corner of the filler 10 may be shaved to size the filler 10 for use in a particular application. If the corner is shaved, or damaged, a disconnect in the electrical conductivity will result in the shaved area. However, the conductivity between the top and the bottom of the filler 10 will not fail since the other side of the filler 10 will remain electrically conductive.

As illustrated in FIG. 1B for the second embodiment of the filler 10, when the conductive layer 22 is wrapped around the core 20, the first adhesive layer 40 preferably secures the area adjacent the first edge 30 of the interior surface 24 of the conductive layer 22 to the top 28 of the core 20 adjacent the first edge 32 of the core 20. The second adhesive layer 42 preferably secures the area adjacent the second edge 38 of the interior surface 24 of the conductive layer 22 to the exterior surface 26 of the conductive layer 22 adjacent the second edge 34 of the core 20.

The second embodiment of the conductive filler 10 is the preferred embodiment for use in a Roebel bar. This is because the resin from the core 20 can raise the resistance of the conductive layer 22. To keep the resistance at a desirable level it is preferable to have two laminations of the conductive layer 22 on at least one side of the filler 10. This side of the filler 10 is preferably placed toward the windings 14 of the Roebel bar as illustrated in FIG. 3. Alternatively, the filler 10 of the first embodiment can be used with or without other means of maintaining the conductive layer's resistance. Other potential solutions include modifying the filler 10 of the first embodiment. Example modifications include lowering the initial resistance of the conductive layer 22, modifying the thickness of the conductive layer 22, or reducing the amount of resin in the core 20.

To assist placement of the filler 10 in coils 18, cabinets and the like, the exterior surface 26 of the conductive layer 22 is preferably provided with an outer adhesive layer 44. The outer adhesive layer 44 is preferably the same type of adhesive as the first and second inner adhesive layers 40, 42, but is also provided with a release liner 46. The release liner 46 prevents the filler 10 from adhering to itself when the filler 10 is rolled for storage and packaging, and protects the underlying adhesive layer 44 until the release liner 46 is removed. The outer adhesive layer 44 can be provided on virtually any location on the outer surface 26 of the conductive layer 22. For most applications, the outer adhesive layer 44 need only provide enough adhesion to temporarily hold the filler 10 in place until the apparatus in which the filler 10 is being used is fully assembled and the filler 10 cannot be easily moved out of place under normal operating conditions.

For use in electrical coils 18¡such as Roebel bars, the outer adhesive layer 44 is preferably placed in the center of one side of the filler 10. In the second embodiment, the adhesive layer 44 is placed on the side of the filler 10 having the overlapping layers, or two laminations, of conductive layer 22 as illustrated in FIG. 1B. This allows the filler to be secured to the conductor windings with the overlapping layers 22 of conductive layer adjacent the conductor windings 14 as illustrated in FIG. 3.

Tests of the filler 10 according to the second embodiment of the present invention were conducted. The tests were conducted under IEEE Standard 286(1975), titled "IEEE Recommended Practice for Measurement of Power-factor Tip-Up of Rotating Machinery Stator Coil Insulation," incorporated herein by reference. Under IEEE Std. 286, the power factor, and resultant Tip-Up value, of four 2, 0kV production style Roebel bars as illustrated in FIG. 3 were measured. Two of the test bars contained filler 10 according to the second embodiment. The other two bars contained non-conductive fillers made from aramids, more specifically a resin rich B-stage aramid and a polyester felt without resin. A low Tip-Up value represents an efficient coil. Preferably, the Tip-Up value is less than 1%. The coils containing the filler 10 according to the second embodiment had very desirable Tip-Up values of 0.48% and 0.51% respectively. The test results also indicate that there is a high repeatability in the performance of the bars using the filler 10. The bar containing a B-stage aramid filler has a Tip-Up value of 1.13%. The bar containing a resin free polyesterfelt has a Tip-Up of 2.570. The following chart shows the power factor, in percent, for each bar at various test voltages.

| Test Voltage (kVrms) | Power Factor (Tan Delta (%)) | | | |
|---|---|---|---|---|
| | Filler #1 (With Conductive Layer 10; Tip-Up of 0.51%) | Filler #2 (With Conductive Layer 10; Tip-Up of 0.48%) | Filler #3 (B-stage aramid; Tip-Up of 1.13%) | Filler #4 (Polyester Felt; Tip-Up of 2.57%) |
| 3.3 | 0.96 | 0.94 | 1.20 | 1.16 |
| 6.6 | 1.24 | 1.23 | 1.38 | 1.68 |
| 9.9 | 1.40 | 1.33 | 1.80 | 2.75 |
| 13.2 | 1.47 | 1.42 | 2.33 | 3.75 |
| 16.5 | 1.57 | 1.56 | 2.97 | 4.51 |
| 19.6 | 1.67 | 1.66 | 3.46 | 5.10 |

Figure 4:
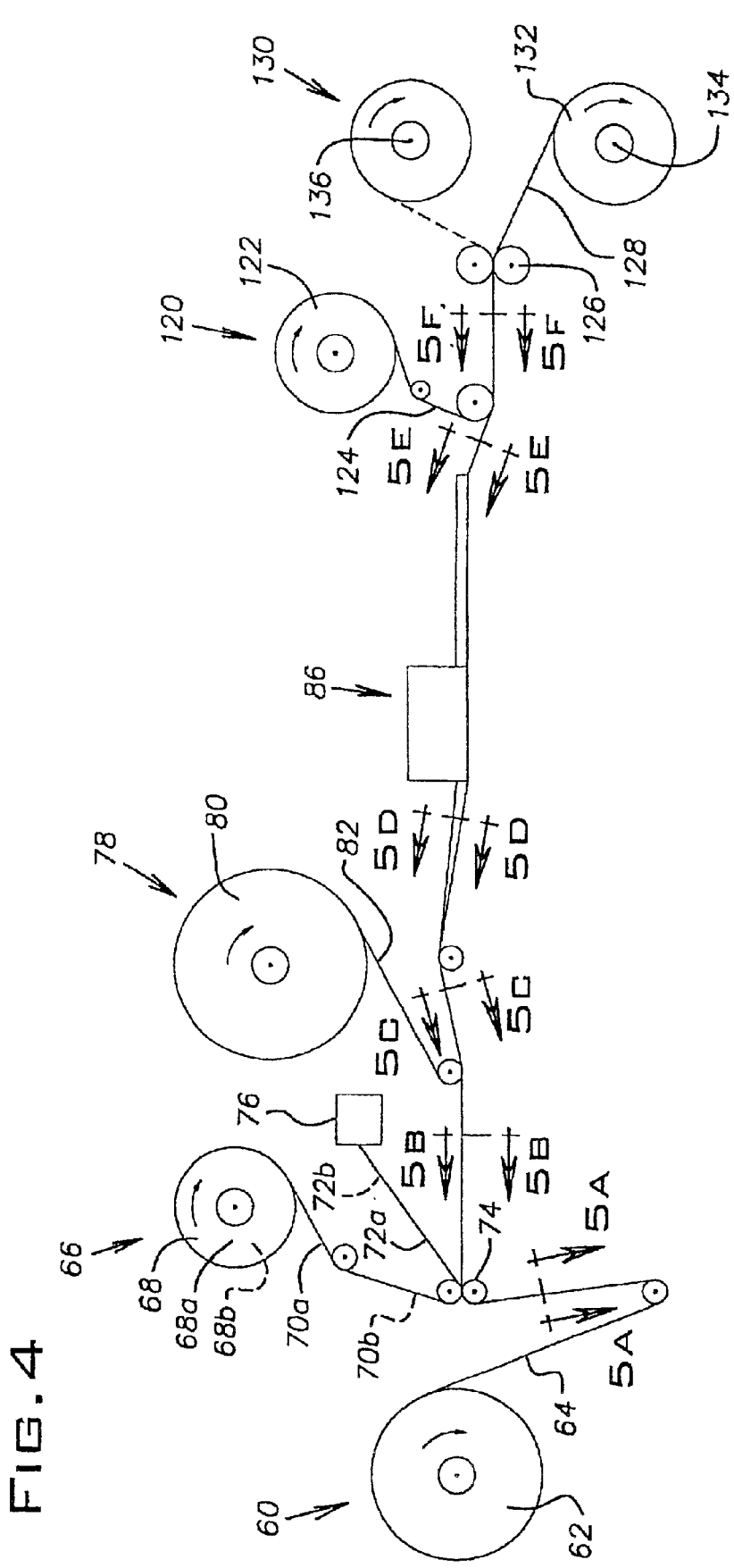
FIG. 4 is a schematic of an assembly line for producing the conductive filler according to either embodiment of the present invention.

FIGS. 4, 5A to 5F, and 6 illustrate a device and a preferred method of producing the conductive filler 10 of the present invention. As best shown in FIGS. 4 and 5A, a first unwind station 60 is provided with a supply roll 62 of a web of conductive layer 22 of the conductive material 64 for forming the conductive layer 22 of the conductive fill 10. It is noted that throughout the method of producing the conductive filler 10 that tensioning rollers are used as needed. Some of the rollers are illustrated but not discussed herein.

The web of conductive layer material 64 is directed to a second unwind station 66 provided with a pair of supply rolls 68 of webs of adhesive. A first supply roll 68a of adhesive provides a web of adhesive layer material 70a for the first adhesive layer 40 and a second supply roll 68b of adhesive provides a web of adhesive layer material 70b for the second adhesive layer 42. The webs of adhesive material 70a, 70b on the supply rolls 68a, 68b are each provided with a suitable release liner 72a, 72b. The webs of adhesive layer material 70a, 70b, along with their release liners 72a, 72b are unwound and respectively positioned on the interior surface 24 of the web of conductive layer material 64 along the first edge 30 and second edge 38 of the conductive layer 22. The webs of conductive layer material 64, adhesive layer material 70 a, 70b and release liners 72a, 72b pass through a pair of pressure or pinch rollers 74 which apply pressure to secure the web of conductive layer material 64 and webs of adhesive 70a, 70b together. The release liners 72a, 72b are then removed from the webs of first and second adhesive layer material 70a, 70b by, a suitable liner collector 76. The liners 72a, 72b can be advantageously removed and collected by a vacuum device. The filler 10 at this stage of production is best illustrated in FIG. 5b and is made of the web of conductive layer material 64 provided with the webs of first and second adhesive layer material 70a, 70b respectively placed along the first edge 30 and second edge 38 of the conductive layer 22.

The web of conductive layer material 64 and the webs of adhesive layer material 70a, 70b are directed to a third unwind station 78. The third unwind station 78 is provided with a supply roll 80 of a web of core material 82. The web of core material 82 is unwound and positioned onto the interior surface of the web of conductor layer material 64 between the first and second edges 30, 38 of the web of conductive-layer material 64 and between the webs of first and second adhesive layer material 70a, 70b as best illustrated in FIG. 5C.

Figure 6:
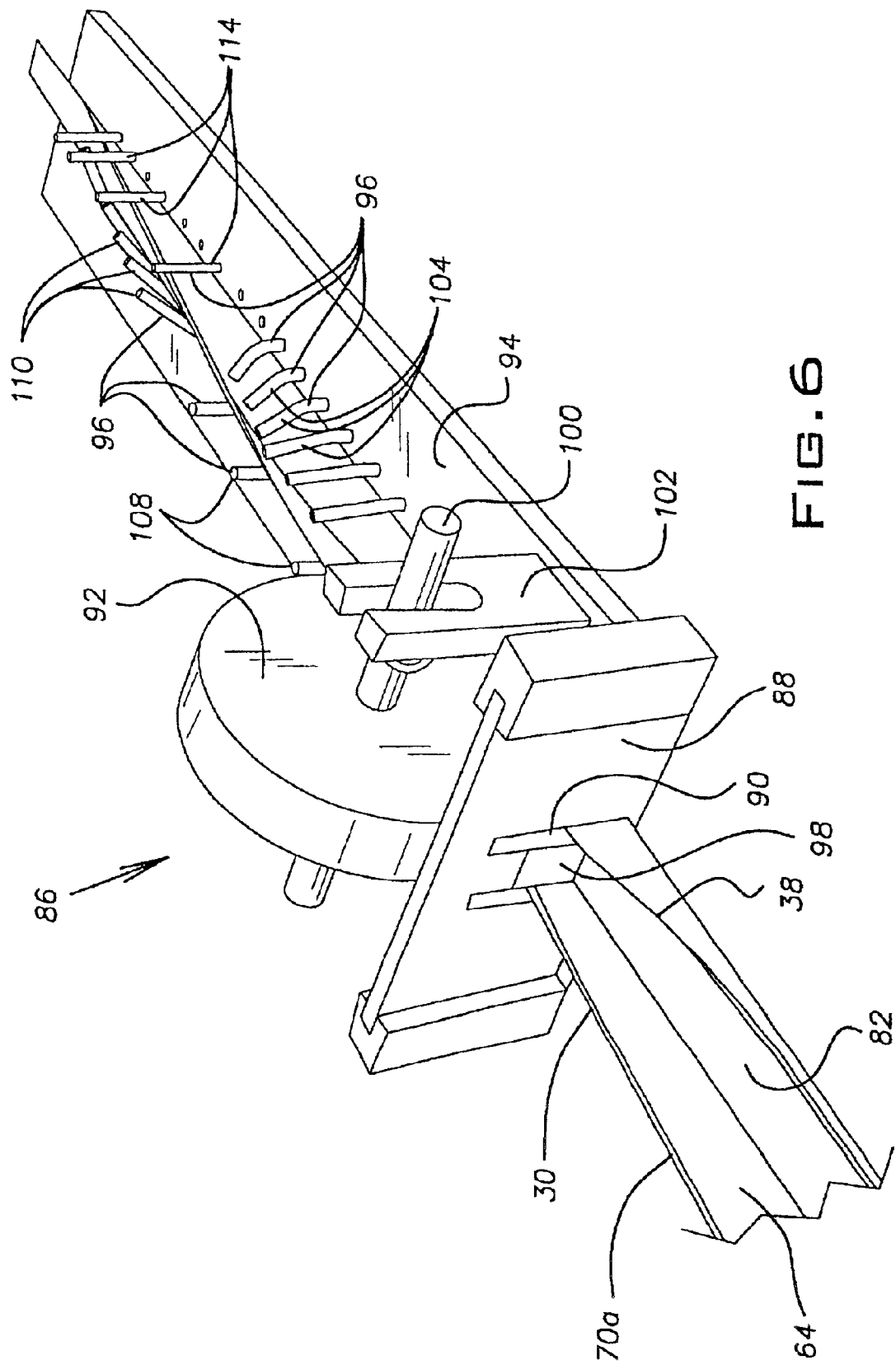
FIG. 6 is a perspective view of a forming station according to the present invention.

The web of core material 82, webs of adhesive layer material 70a, 70b and the web of conductive layer material 64 are directed to a forming station 86. As best shown in FIGS. 4, 5D and 6, the forming station 86 folds the web of conductive layer material 64 around the web of core material 82 by upwardly bending, or folding, the first and second edges 30, 38 of the web of conductive layer material 64.

The forming station 86 further wraps the web of conductive layer material 64 around the web of core material 82 so that the first edge, 30 of the web of conductive layer material 64 is wrapped onto the top surface 28 of the web of core material 82 and the second edge 38 of the web of conductive layer material 82 is wrapped onto the web of conductive layer material 82, as illustrated in FIG. 5E. Wrapped in this manner, the web of conductive layer material 64 is now wrapped completely around the web of core material 82. It is noted that the folds in the web of conductive layer material 64 are started by hand, but, once started, the rest of the web of conductive layer material 64 is folded automatically. It is noted however that the entire folding, or cuffing, process can be automated using suitable tooling.

Referring to FIG. 6, the forming station 86 provides a die 88 defining a "U-shaped" channel, or passageway 90, a roller 92, a base 94 and a series of posts 96. The webs of conductive layer material 64, adhesive layer material 70a, 70b, and core layer material 82 pass through the U-shaped passageway 90. The portions of the web of conductive layer material 64 that are to be folded onto the top 28 of the web of core material 82 are bent upward and pass through respective leg portions of the passageway 90. The web of core material 82 and the remaining portion of the web of conductive layer material 64 pass through a base of the passageway 90. To help prevent snagging and tearing of web the core material 82 and the web of conductive layer material 64, the die 88 can optionally be lined with a piece of low friction guide material 98 surrounding the passageway 90. After the webs 64, 70a, 70b, 82 pass through the passageway g0, the web of conductive layer material 64 has a U-shaped cross section matching the shape of the passageway 90 and the portion of the exterior surface 26 of the web of conductive layer material 64 that forms the bottom of the liner 10 slides along the base 94. The web of core material 82 is weighted downward and held in position by the roller 92 by trapping the web of core material 82 and the web of conductive layer material 64 between the roller 92 and the base 94. The roller 92 is allowed to rotate about an axis on an axle 100 supported by stanchions 102. The circumference of the roller 92 may also be provided with a low friction material. Optionally, the circumference of the roller 92 may have a concave or convex profile to shape the web of core 10 material 82.

After the webs 64, 82 pass under the roller, the upwardly turned portions of the web of conductive layer material 64 are wrapped completely around the web of core material 82. This is accomplished by bending the first edge 30 of the web of conductive layer material 64 toward the first edge 32 of the web of core material 82 and subsequently bending the second edge 38 of the web of conductive layer material 64 over the first edge 32 of the web of conductive layer material 64 and toward the second edge 34 of the web of core material 82. This wrapping process is carried out by the series of posts 96. Preferably, the posts 96 are securely mounted in the base 94. A first set of progressively bent posts 104 direct the first edge 30 of the web of conductive layer material 64 over the web of core material 82 towards the first edge 32 of the web of core material 64 to form a first, or inner, conductor layer lamination 106 (FIG. 5E) disposed on the top 28 of the web of core material 82. A first set of guide posts 108 are disposed on the oppositeside of the web of partially formed filler material from the first set of progressively bent posts 104 to help the web of partially formed filler material continue to travel in a linear fashion. A second set of progressively bent posts 110 are located on the opposite side of the partially formed filler from the first set of progressively bent posts 104 but down stream from the first set of guide posts 108. The second set of progressively bent posts 110 direct the second edge 38 of the web of conductive layer material 64 over the inner conductor layer lamination 106 to form a second, or outer, conductor layer lamination 112 (FIG. 5E) on the exterior surface 26 of the inner conductor layer lamination 106. A second set of guide posts 114 are disposed on the opposite side of the web of partiallyformed filler material from the second set of progressively bent posts 110 to help the web of partially formed filler material continue to travel in a linear fashion. One skilled in the art will appreciate that the wrapping need not be carried out by posts or finger like projections as illustrated, but can be carried out by other types of barriers that are arranged to direct the conductive layer into position, such as by strips of sheet metal.

Referring to FIG. 4, the web of core material 82 and the now wrapped web of conductive layer material 64 are directed to a forth unwind station 120. The forth unwind station 120 is provided with a supply roll 122 of a web of adhesive and liner material 124 for forming the outer adhesive layer 44 and the release liner 46. As best shown in FIGS. 4 and 5F, the web of adhesive and liner material 124 is directed onto the top external surface of the web of conductive layer material 64 where it is centrally positioned. The assembled filler 10 is then directed to a pair of pressure or pinch rollers 126. The pinch rollers 126 apply pressure to set the webs of adhesive material 70a, 70b and supply sufficient pressure to secure the web of adhesive and liner material 124 to the web of conductive layer material 64, thereby forming a completed web 128 of conductive filler 10. The completed web 128 of the conductive filler 10 is then directed to a rewind station 130 were it is wound into a roll 132, preferably around a cardboard or plastic sleeve. Once rolled, the conductive filler 10 can be packaged and shipped. The rolled filler stock can be unwound and used in the production of electric coils, shielded cabinets and the like.

The rewind station 130 is provided with a first take up roller 134 and a second take up roller 136. Each take up roller 134, 136 is preferably provided with a clutch. Once a predetermined length of completed web 128 is wound on the first take up roller 134, e.g., 225 inches, the clutch stops rotation of the roller 134. The completed web 128 may then be cut and positioned for winding on the second take up roller 136. Rotational movement of the second take up roller 136 is stopped by its clutch after a predetermined length of completed web 128 is wound thereon. The completed web 128 is then cut and moved to the first take up roller 134 and the foregoing process is 5 repeated.

Although particular embodiments of the invention have been described in detail, it will be understood that the invention is not limited correspondingly in scope, but includes all changes and modifications coming within the spirit and terms of the claims appended hereto.

What is claimed is:

1. A method of making a web of conductive filler, comprising the steps of:

placing a web of core material onto an interior surface of a web of conductive layer material comprising fibers wherein substantially all the fibers are non-conductive; and turning first and second edges of the conductive layer material upward, folding the first edge of the conductive layer material over the core material, and folding the second edge of the conductive layer material over the first edge of conductive layer material.

2. The method according to claim 1, further comprising the step of placing a web of adhesive layer material onto the interior surface of the web of conductive layer material.

3. The method according to claim 2 wherein said web of conductive layer includes the substantially non-conductive fiber impregnated with a conductive resin.

4. The method according to claim 1, further comprising the step of placing a web of adhesive layer material onto the interior of the web of conductive layer material.

5. The method according to claim 1 wherein said web of conductive layer includes the substantially non-conductive fiber impregnated with a conductive resin.

6. A method for making a conductive filler material comprising the steps of:
  selecting a web of conductive layer material comprising fibers wherein substantially all the fibers are non-conductive said web of conductive layer material having an interior surface and an exterior surface;
  positioning a web of non-conducting core material onto said interior surface of said web of conductive layer material;
  folding said web of conductive layer material around said web of non-conducting core material, wherein said web of conductive layer material is completely wrapped around said web of non-conducting core material; and
  pressing said web of non-conducting core material wrapped with said web of conductive layer material by passing through a pair of rollers to form said conductive filler.

7. The method according to claim 6, wherein said web of conductive layer material includes substantially non-conductive fiber impregnated with a conductive resin.

8. The method according to claim 7, wherein said web of conductive layer material is folded around said web of non-conducting core material such that said web of conductive layer material overlaps itself on one side of said web of non-conducting core material, thereby forming a laminated layer of said web of conductive layer material.

9. The method according to claim 6, wherein said web of conductive layer material is folded around said web of non-conducting core material such that said web of conductive layer material overlaps itself on one side of said web of non-conducting core material, thereby forming a laminated layer of said web of conductive layer material.

10. A method for making a conductive filler material in a continuous process comprising the steps of:
  selecting a web of conductive material, said web of conductive material having an interior surface and an exterior surface, with said interior surface including a first edge and a second edge;
  selecting a first adhesive web;
  selecting a second adhesive web;
  positioning said first adhesive web on said first edge of said web of conductive material;
  positioning said second adhesive web on said second edge of said web of conductive material;
  selecting a web of a non-conducting core material;
  positioning said web of non-conducting core material onto said interior surface of said web of conductive material between said first and said second adhesive webs;
  folding said web of conductive material with said first and said second adhesive webs thereon around said web of non-conducting core material, wherein said web of conductive material is completely wrapped around said web of non-conducting core material; and
  pressing said web of conductive material with said first and said second adhesive webs thereon folded around said web of non-conducting core material by passing through a pair of rollers to form said conductive filler.

11. The method according to claim 10, wherein said web of conductive material includes substantially non-conductive fiber impregnated with a conductive resin.

12. The method according to claim 11, wherein said web of conductive material is folded around said web of non-conducting core such that said web of conductive material overlaps itself on one side of said web of non-conducting core material, and further wherein one of said first and said second adhesive webs is against a top surface of said web of non-conducting core material and the other of said first and said second adhesive webs is against said exterior surface of said web of conductive material, thereby forming a conductive filler having a laminated layer of said conductive material.

13. The method for making a conductive filler material of claim 10, wherein said web of conductive material is folded around said web of non-conducting core such that said web of conductive material overlaps itself on one side of said web of non-conducting core, and further wherein one of said first and said second adhesive webs is against a top surface of said web of non-conducting core material and the other of said first and said second adhesive webs is against said exterior surface of said web of conductive material, thereby forming a conductive filler having a laminated layer of said conductive material.

14. A method for making a conductive filler material comprising the steps of:
  selecting a web of conductive material, said conductive material including a substantially non-conductive fiber impregnated with a conductive resin; said web of conductive material having an interior surface and an exterior surface;
  selecting a first adhesive web having a first side and a second side, said first side of said first adhesive web covered by a first release liner,
  selecting a second adhesive web having a first side and a second side, said first side of said second adhesive web covered by a second release liner;
  positioning said first adhesive web covered by said first release liner on said first edge of said web of conductive material, wherein said second side of said first adhesive web is in contact with said interior surface of said web of conductive material;
  positioning said second adhesive web covered by said second release liner on said second edge of said web of conductive material, wherein said second side of said second adhesive web is in contact with said interior surface of said web of conductive material;
  pressing to secure said first adhesive web and said second adhesive web to said web of conductive material, wherein said pressing is done by passing said web of conductive material with said adhesive webs thereon through a first pair of rollers;
  removing said first release liner from said first adhesive web;
  removing said second release liner from said second adhesive web;
  selecting a web of non-conducting core material including non-woven fibers impregnated with a resin;
  positioning said web of non-conducting core material onto said interior surface of said web of conductive material between said first and said second adhesive webs;

folding said web of conductive material with said first and said second adhesive webs thereon around said web of non-conducting core material at a forming station by upwardly bending or folding said web of conductive material to form an unfinished filler; and pressing said unfinished filler by passing said unfinished filler through said second pair of rollers, wherein sufficient pressure is applied by said pressing to secure said second side of said outer adhesive web to said center portion of said top surface of said unfinished filler, thereby forming said conductive filler.

15. The method for making a conductive filler material of claim 14, wherein said web of conductive material is folded around said web of non-conducting core such that one of said first and said second adhesive webs is against a surface of said web of non-conducting core material and the other of said first and said second adhesive webs is against said exterior surface of said web of conductive material, said bending or folding forming a laminated layer of said web of conductive material, wherein said web of conductive material is completely wrapped around said web of non-conducting core material, thereby forming said unfinished filler having said laminated layer of said conductive material, said method thereby resulting in a conductive filler having said laminated layer of said conductive material.

16. The method according to claim 14, further comprising the steps of:

selecting an outer adhesive web having a first side and a second side, said first side of said outer adhesive web covered by an outer release liner; and directing said outer adhesive web with said outer release liner onto a center portion of said top surface of said unfinished filler, and then completing the step directing said unfinished filler toward said second pair of rollers.

17. The method for making a conductive filler material of claim 14, wherein said web of conductive material is folded around said web of non-conducting core such that one of said first and said second adhesive webs is against a top surface of said web of non-conducting core material and the other of said first and said second adhesive webs is against said exterior surface of said web of conductive material, said bending or folding forming a laminated layer of said web of conductive material, wherein said web of conductive material is completely wrapped around said web of non-conducting core material, thereby forming the unfinished filler with a top surface having with said laminated layer of said conductive material, said method thereby resulting in a conductive filler with a top surface having said laminated layer of said conductive material.

18. A method for making a conductive filler material comprising the steps of:

feeding a web of conductive material from a roll of said web of conductive material at a first unwind station, said conductive material including substantially non-conductive fiber impregnated with a conductive resin; said web of conductive material having an interior surface and an exterior surface, with said interior surface including a first edge and a second edge;

directing said web of conductive material to a second unwind station having a first and a second roll of adhesive material, wherein said first roll of adhesive material includes a first adhesive web having a first side and a second side, said first side of said first adhesive web covered by a first release liner, and further wherein said second roll of adhesive material includes a second adhesive web having a first side and a second side, said first side of said second adhesive web covered by a second release liner;

unwinding and positioning said first adhesive web covered by said first release liner on said first edge of said web of conductive material, wherein said second side of said first adhesive web is in contact with said interior surface of said web of conductive material;

unwinding and positioning said second adhesive web covered by said second release liner on said second edge of said web of conductive material, wherein said second side of said second adhesive web is in contact with said interior surface of said web of conductive material;

directing said web of conductive material with both said first adhesive web with said first release liner and said second adhesive web with said second release liner thereon toward a first pair of rollers;

pressing to secure said first adhesive web and said second adhesive web to said web of conductive material, wherein said pressing is done by passing said web of conductive material with said adhesive webs thereon through said first pair of rollers;

removing said first release liner from said first adhesive web by using a first liner collector;

removing said second release liner from said second adhesive web by using one of said first liner collector and a second liner collector;

directing said web of conductive material with both said first and said second adhesive webs thereon to a third unwind station containing a roll of a web of a non-conducting core material, said web of non-conducting core material including non-woven fibers impregnated with a resin;

feeding and positioning said web of non-conducting core material onto said interior surface of said web of conductive material between said first and said second adhesive webs;

directing said web of conductive material with both said first and said second adhesive webs thereon and also with said web of non-conducting core material thereon, to a forming station;

folding said web of conductive material with said first and said second adhesive webs thereon around said web of non-conducting core material by upwardly bending or folding said web of conductive material, wherein one of said first and said second adhesive webs is against a top surface of said web of non-conducting core material and the other of said first and said second adhesive webs is against said exterior surface of said web of conductive material, said bending or folding forming a laminated layer of said web of conductive material, wherein said web of conductive material is completely wrapped around said web of non-conducting core material, thereby forming an unfinished filler with a top surface having said laminated layer of said conductive material;

directing said unfinished filler toward a second pair of rollers; and pressing said unfinished filler by passing said unfinished filler through said second pair of rollers, wherein sufficient pressure is applied by said pressing to secure said second side of said outer adhesive web to said center portion of said top surface of said unfinished filler, thereby forming said conductive filler.

19. The method according to claim 18, further comprising the steps of:

before directing said unfinished filler toward said second pair of rollers, directing said unfinished filler material toward a fourth unwind station containing a third roll of adhesive material containing an outer adhesive web having a first side and a second side, said first side of said outer adhesive web covered by an outer release liner; and unwinding and directing said outer adhesive web with said outer release liner onto a center portion of said top surface of said unfinished filler, and then completing the step directing said unfinished filler toward said second pair of rollers.

20. The method according to claim 19, further comprising the steps of:

directing said conductive filler toward a rewind station; and winding said conductive filler onto a rewind roll using said rewind station, wherein said conductive filler can then be packaged and shipped to a destination.

21. A method for making a conductive bar comprising the steps of:

selecting a web of conductive material, said conductive material including a substantially non-conductive fibers impregnated with a conductive resin; said web of conductive material having an interior surface and an exterior surface, said interior surface including a first edge and a second edge;

selecting a first adhesive web having a first side and a second side, said first side of said first adhesive web covered by a first release liner;

selecting a second adhesive web having a first side and a second side, said first side of said second adhesive web covered by a second release liner;

positioning said first adhesive web covered by said first release liner on said first edge of said web of conductive material, wherein said second side of said first adhesive web is in contact with said interior surface of said web of conductive material;

positioning said second adhesive web covered by said second release liner on said second edge of said web of conductive material, wherein said second side of said second adhesive web is in contact with said interior surface of said web of conductive material;

pressing to secure said first adhesive web and said second adhesive web to said web of conductive material, wherein said pressing is done by passing said web of conductive material with said adhesive webs thereon through a first pair of rollers;

removing said first release liner from said first adhesive web;

removing said second release liner from said second adhesive web;

selecting a web of a non-conducting core material, said web of non-conducting core material including non-woven fibers impregnated with a resin;

positioning said web of non-conducting core material onto said interior surface of said web of conductive material between said first and said second adhesive webs;

folding said web of conductive material with both said first and said second adhesive webs thereon around said web of non-conducting core material at a forming station by upwardly bending or folding said web of conductive material, wherein one of said first and said second adhesive webs is against a surface of said web of non-conducting core material and the other of said first and said second adhesive webs is against said exterior surface of said web of conductive material, said bending or folding forming a laminated layer of said web of conductive material, wherein said web of conductive material is completely wrapped around said web of non-conducting core material, thereby forming an unfinished filler having said laminated layer of said conductive material;

selecting an outer adhesive web having a first side and a second side, said first side of said outer adhesive web covered by an outer release liner;

directing said outer adhesive web with said outer release liner onto a center portion of said top surface of said unfinished filler;

pressing said unfinished filler by passing said unfinished filler through a second pair of rollers, wherein sufficient pressure is applied by said pressing to secure said second side of said outer adhesive web to said center portion of said top surface of said unfinished filler, thereby forming said conductive filler;

placing said conductive filler at a top and a bottom of a stack of windings;

wrapping an insulating groundwall around said conductive filler with said stack of windings; and forming said conductive bar by sealing said insulating groundwall.

22. A method of making a conductive filler, comprising the steps of:

wrapping a web of conductive material comprising fibers wherein substantially all the fibers are non-conductive impregnated with a conductive resin around a core material, wherein an adhesive is between and in contact with at least a portion of the core material and the web of conductive material; and pressing said web of conductive material wrapped around said web of core material to form said conductive filler.

* * * * *

UNITED STATES PATENT AND TRADEMARK OFFICE
CERTIFICATE OF CORRECTION

PATENT NO. : 6,827,805 B2
DATED : December 8, 2005
INVENTOR(S) : Angell et al.

It is certified that error appears in the above-identified patent and that said Letters Patent is hereby corrected as shown below:

Column 8,
Line 56, please delete "web of".

Column 9,
Lines 3, 9 and 30, please delete "fiber" and insert therefor -- fibers --.

Column 10,
Lines 5 and 31, please "fiber" and insert therefor -- fibers --.

Column 11,
Line 56, please delete "fiber" and insert therefor -- fibers --.

Signed and Sealed this

Tenth Day of May, 2005

JON W. DUDAS
*Director of the United States Patent and Trademark Office*